United States Patent
Domenger et al.

(10) Patent No.: US 11,030,740 B2
(45) Date of Patent: Jun. 8, 2021

(54) DIGITAL ANALYSIS OF A DIGITAL IMAGE REPRESENTING A WOUND FOR ITS AUTOMATIC CHARACTERISATION

(71) Applicant: Urgo Recherche Innovation et Developpement, Chenôve (FR)

(72) Inventors: Jean-Philippe Domenger, Pessac (FR); Boris Mansencal, Pessac (FR); Julien Steinbrunn, Messigny et Vantoux (FR)

(73) Assignee: URGO RECHERCHE INNOVATION ET DEVELOPPEMENT, Chenôve (FR)

( * ) Notice: Subject to any disclaimer, the term of this patent is extended or adjusted under 35 U.S.C. 154(b) by 0 days.

(21) Appl. No.: 16/068,778

(22) PCT Filed: Dec. 15, 2016

(86) PCT No.: PCT/FR2016/053442
§ 371 (c)(1),
(2) Date: Jul. 9, 2018

(87) PCT Pub. No.: WO2017/118785
PCT Pub. Date: Jul. 13, 2017

(65) Prior Publication Data
US 2019/0026891 A1    Jan. 24, 2019

(30) Foreign Application Priority Data
Jan. 7, 2016    (FR) ...................................... 1650111

(51) Int. Cl.
*G06K 9/00*    (2006.01)
*G06T 7/00*    (2017.01)
(Continued)

(52) U.S. Cl.
CPC .............. *G06T 7/0012* (2013.01); *G06K 9/34* (2013.01); *G06K 9/342* (2013.01); *G06K 9/4652* (2013.01);
(Continued)

(58) Field of Classification Search
CPC . G06T 7/0012; G06T 7/10; G06T 7/11; G06T 7/136; G06T 7/143; G06T 7/187;
(Continued)

(56) References Cited

U.S. PATENT DOCUMENTS

| 7,689,016 B2 * | 3/2010 | Stoecker | G06T 7/0012 |
| | | | 382/128 |
| 8,543,519 B2 * | 9/2013 | Guyon | G06T 7/0012 |
| | | | 706/12 |

(Continued)

OTHER PUBLICATIONS

Ederson A. G. Dorileo, Marco A. C. Frade, Rangaraj M. Rangayyan, Paulo M. Azevedo-Marques, "Segmentation and Analysis of the Tissue Composition of Dermatological Ulcers", IEEE, Canadian Conference on Electrical and Computer Engineering (CCECE), May 2010, pp. 1-4 (Year: 2010).*

(Continued)

*Primary Examiner* — Eric Rush
(74) *Attorney, Agent, or Firm* — Kenealy Vaidya LLP

(57) ABSTRACT

Some embodiments are directed to a mobile terminal allowing the determination of information relating to a wound, including a photographic apparatus for acquiring an image of a zone containing the wound and device adapted for determining a first likelihood map associated with a first characteristic of the zone by using a first classifier; determining a second likelihood map associated with a second characteristic, by using a second classifier, distinct from the first classifier; segmenting the image into regions of homogeneous colour; matching the regions with the first and second maps, and adapting these regions so as to determine (Continued)

regions corresponding substantially to the wound, and determine these items of information on the basis of these regions and displaying them on a screen of the terminal.

21 Claims, 1 Drawing Sheet

(51) Int. Cl.
| | |
|---|---|
| G06T 7/11 | (2017.01) |
| G06T 7/187 | (2017.01) |
| G06K 9/34 | (2006.01) |
| G06K 9/62 | (2006.01) |
| G06K 9/46 | (2006.01) |
| G06T 7/143 | (2017.01) |
| G06T 7/60 | (2017.01) |
| G06T 7/62 | (2017.01) |

(52) U.S. Cl.
CPC .............. *G06K 9/6288* (2013.01); *G06T 7/11* (2017.01); *G06T 7/143* (2017.01); *G06T 7/187* (2017.01); *G06T 7/60* (2013.01); *G06T 7/62* (2017.01); *G06K 2209/05* (2013.01); *G06T 2207/10024* (2013.01); *G06T 2207/20104* (2013.01); *G06T 2207/30088* (2013.01); *G06T 2207/30096* (2013.01)

(58) Field of Classification Search
CPC .... G06T 7/60; G06T 7/62; G06T 7/90; G06T 2207/10024; G06T 2207/20076; G06T 2207/20081; G06T 2207/20084; G06T 2207/20104; G06T 2207/30088; G06T 2207/30096; G06K 9/34; G06K 9/342; G06K 9/4652; G06K 9/62; G06K 9/6201; G06K 9/6202; G06K 9/6212; G06K 9/6267; G06K 9/6269; G06K 9/6288; G06K 9/6292; G06K 2209/05
USPC ....... 382/100, 128, 159, 164, 165, 173, 181, 382/190, 199, 224; 600/306, 407, 408; 128/922–925
See application file for complete search history.

(56) References Cited

U.S. PATENT DOCUMENTS

| | | | | |
|---|---|---|---|---|
| 2004/0267102 | A1* | 12/2004 | Skladnev | A61B 5/442 382/128 |
| 2011/0038523 | A1* | 2/2011 | Boardman | G06T 7/0012 382/133 |
| 2011/0286654 | A1* | 11/2011 | Krishnan | G06K 9/0014 382/133 |
| 2014/0036054 | A1* | 2/2014 | Zouridakis | G06T 7/0012 382/110 |
| 2015/0150457 | A1* | 6/2015 | Wu | G06T 7/0012 600/425 |
| 2016/0284084 | A1* | 9/2016 | Gurcan | G06K 9/6284 |
| 2017/0116744 | A1* | 4/2017 | Abedini | G06T 7/0012 |
| 2017/0231550 | A1* | 8/2017 | Do | G06T 7/0012 382/128 |

OTHER PUBLICATIONS

Rashmi Mukherjee, Dhiraj Dhane Manohar, Dev Kumar Das, Arun Achar, Analava Mitra, and Chandan Chakraborty, "Automated Tissue Classification Framework for Reproducible Chronic Wound Assessment", Journal of Biomedicine and Biotechnology, vol. 2014, Jul. 2014, pp. 1-9 (Year: 2014).*

Francisco J. Veredas, Rafael M. Luque-Baena, Francisco J. Martín-Santos, Juan C. Morilla-Herrera, Laura Morente, "Wound image evaluation with machine learning", Neurocomputing, vol. 164, Sep. 2015, pp. 112-122 (Year: 2015).*

Lei Wang, Peder C. Pedersen, Diane M. Strong, Bengisu Tulu, Emmanuel Agu, and Ronald Ignotz, "Smartphone-Based Wound Assessment System for Patients With Diabetes", IEEE Transactions on Biomedical Engineering, vol. 62, No. 2, Feb. 2015, pp. 477-488 (Year: 2015).*

Hazem Wannous, Yves Lucas, and Sylvie Treuillet, "Enhanced Assessment of the Wound-Healing Process by Accurate Multiview Tissue Classification", IEEE Transactions on Medical Imaging, vol. 30, No. 2, Feb. 2011, pp. 315-326 (Year: 2011).*

Fauzi, M. F. A., et al., "Computerized segmentation and measurement of chronic wound images," Computers Biol. Med. 2015;60:74-85.

Wannous, H., et al., "Efficient SVM Classifier Based on Color and Texture Region Features for Wound Tissue Images," SPIE, P.O. Box 10 Bellingham, WA 98227-0010, USA, Mar. 27, 2008, XP040434995, pp. 6-7.

Platt, J. C., "Probabilistic Outputs for Support Vector Machines and Comparisons to Regularized Likelihood Methods," Advances in Large Margin Classifiers, Mar. 26, 1999, 11 pp., XP009077501.

International Search Report and Written Opinion for PCT Patent App. No. PCT/FR2016/053442 (dated Feb. 24, 2017) with English translation of the ISR.

* cited by examiner

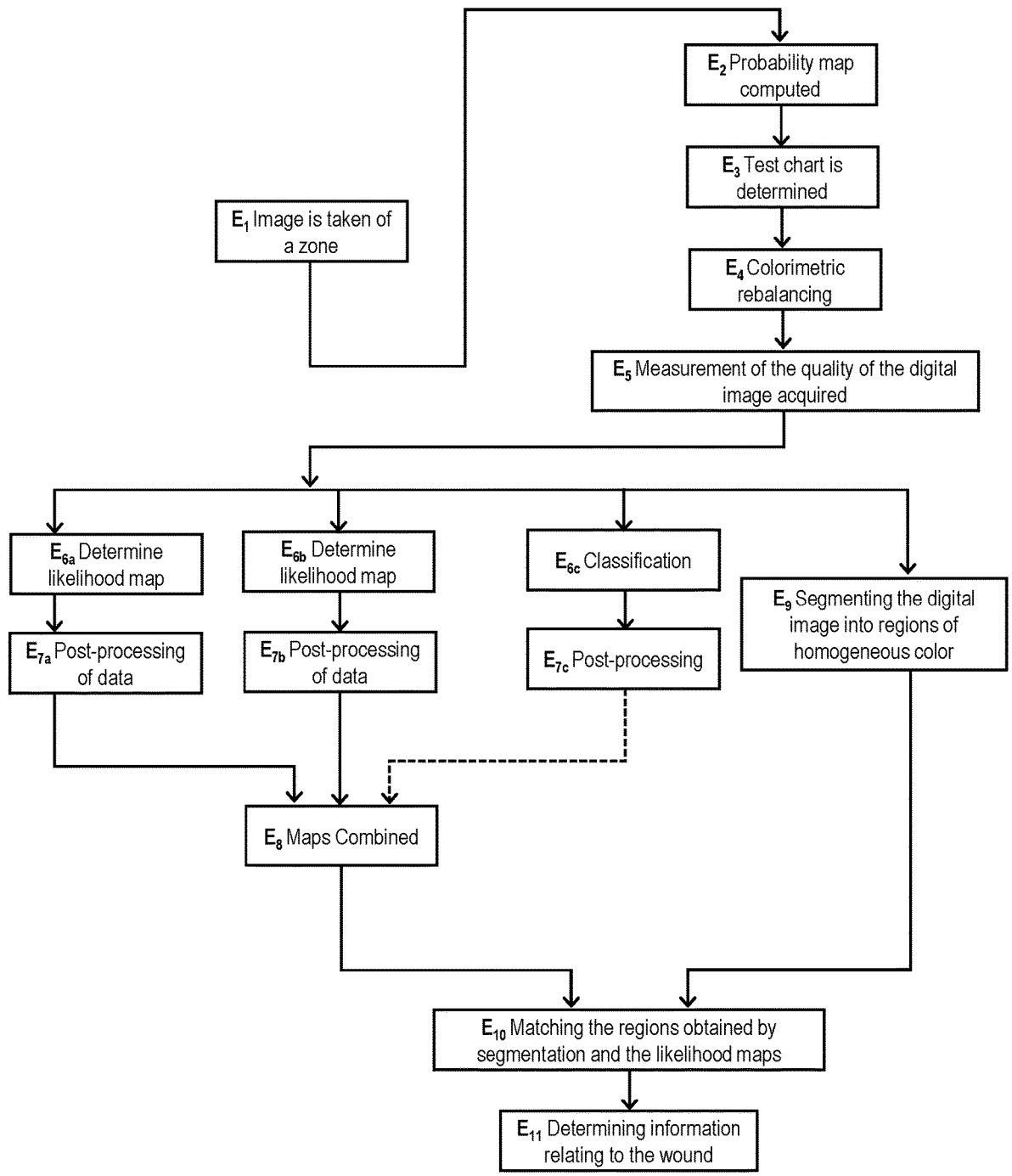

DIGITAL ANALYSIS OF A DIGITAL IMAGE REPRESENTING A WOUND FOR ITS AUTOMATIC CHARACTERISATION

CROSS REFERENCE TO RELATED APPLICATIONS

This application is a national phase filing under 35 C.F.R. § 371 of and claims priority to PCT Patent Application No. PCT/FR2016/053442, filed on Dec. 15, 2016, which claims the priority benefit under 35 U.S.C. § 119 of French Patent Application No. 1650111, filed on Jan. 7, 2016, the contents of each of which are hereby incorporated in their entireties by reference.

BACKGROUND

Some embodiments relate to the medical field, and in particular to a method for the automatic analysis of a wound in order to characterise the wound.

A wound is a breach of the skin barrier. It may only affect the skin (which is an organ composed of a plurality of layers of tissues) but also impact the flesh underneath and other elements of the human body such as tendons, etc.

A wound may result from various causes: injury by sharp or contusive objects, burn, surgical procedure, bite, fall, etc. Numerous everyday life scenarios are therefore liable to cause wounds.

Wound healing is a natural biological phenomenon, human and animal tissues being capable of repairing localised lesions by repair and regeneration processes specific thereto.

The healing rate and quality of a wound are dependent on the general state of the organism affected, the cause of the wound, the condition and location of the wound, and the onset or not of infection, as well as genetic factors predisposing or not to healing disorders.

The natural healing of a wound takes place essentially according to three successive phases, each of these phases being characterised by specific cellular activities which promote the repair process according to specific chronological sequences: the inflammatory phase, the granulation phase (or proliferative phase), and the scar formation phase.

The first phase, the inflammatory phase, commences from the rupture of the blood vessels triggering the formation of a clot (blood coagulation) essentially composed of fibrin and fibronectin, and which will form a temporary matrix. This matrix partially fills the lesion and will enable migration within the damaged zone of inflammatory cells recruited to cleanse the wound. The platelets present will also release factors (e.g. cytokine, growth factors) enabling the recruitment of healing cells such as inflammatory cells (neutrophils and macrophages), fibroblasts and endothelial cells.

The second phase corresponds to the development of granulation tissue. Firstly, a colonisation of the wound by fibroblast proliferation is observed. Then, migration of endothelial cells from healthy vessels will enable neovascularisation, or angiogenesis, of the damaged tissue. In the granulation tissue, the fibroblasts are activated and will be differentiated into myofibroblasts exhibiting significant contractile properties, generated by actin microfilaments, enabling contraction of the wound. These microfilaments are expressed by a protein: a-smooth muscle actin. These myofibroblasts therefore play a major role in the formation and maturation of granulation tissue which will lead to healing of the lesion. Migration of keratinocytes and reconstruction of the epidermis subsequently take place.

The third phase of the repair process, scar formation or maturation, is accompanied by restructuring of the granulation tissue. Part of the extracellular matrix is digested by proteases (essentially matrix metalloproteinases (MMP) and elastases), and progressive reorganisation of the extracellular matrix is observed. Progressively, collagen type III, in a majority in the granulation tissue, is replaced by collagen type I, the primary matrix component of the dermis. At the end of the maturation phase, the fibroblasts, myofibroblasts and vascular cells see the proliferation and/or activity thereof reduced. Then the excess cells die by apoptosis. In parallel with the restructuring of the extracellular matrix and the apoptosis of excess cells, the inflammatory state decreases progressively. This phase is the longest: after approximately one year, the scar is restructured, it is no longer red, or rigid, no longer causes pain and flattens.

SUMMARY

Monitoring the healing process can be very important to wound care.

In some cases, the healing process does not go so well, and some types of wounds do not heal correctly, the 3 key steps of the process taking place abnormally, despite providing the best possible physicochemical and biological conditions. Indeed, the healing rate and quality of a wound are dependent on intrinsic and extrinsic factors. This repair process may therefore be abnormally prolonged according to:

the cause of the wound;
the condition and location thereof;
the onset of infection caused by the presence of certain infectious agents such as *Staphylococcus aureus* or *Pseudomonas aeruginosa;*
the existence of a pre-existing condition (such as diabetes, immune deficiency, venous insufficiency, etc.);
the external environment; or
genetic factors predisposing or not to healing disorders.

These wounds include chronic wounds such as venous ulcers, pressure sores and characteristic wounds of diabetic subjects, such as diabetic foot wounds.

Chronic wounds are defined by a lack of healing after a period of 6 weeks from the appearance of the wound, regardless of the treatment applied.

Analysis and monitoring of these wounds therefore informs and impacts the care and treatment thereof.

Some embodiments therefore are directed to a tool for assisting a person to diagnose this type of wound, and, therefore, to determine the care to be provided as quickly as possible.

Some embodiments are directed to a method for the digital analysis of a wound for the automatic determination of information relating to the wound, including:

acquiring a digital image of a zone of skin containing the wound;
determining a first likelihood map associated with a first characteristic of the zone using a first classifier on the image;
determining a second likelihood map associated with a second characteristic of the zone, using a second classifier, distinct from the first classifier, on the image;
segmenting the image into regions of homogeneous colour;
matching the regions with the first and second likelihood maps, and adapting the regions so as to determine regions corresponding substantially to the wound; and determining the information on the basis of the regions corresponding substantially to the wound.

Preferred or some embodiments include one or a plurality of the following features which may be used separately or in partial combination with each other or in complete combination with each other:

the first characteristic corresponding to fibrin, and the second characteristic corresponding to buds;

the method further includes determining a third likelihood map associated with a third characteristic of the zone, using a third classifier, the third characteristic corresponding to the wound;

the first and second classifiers are support vector machines;

the first likelihood map and the second likelihood map are combined in an overall likelihood map so as to match the regions with the first and second likelihood maps;

in the overall likelihood map, the points corresponding to necrosis are determined by segmentation based on colorimetric thresholding;

the digital image is segmented into regions by a split and merge algorithm;

the information includes the size of the wound;

the determination of the information includes determining distribution rates of the first and second characteristics;

the step for determining distribution rates of the first and second characteristics uses a classifier distinguishing the first characteristic from the second characteristics within regions corresponding substantially to the wound.

the method includes one or a plurality of steps prior to the determination of the likelihood maps among centring of the wound in the middle of the digital image, computing a probability map, scaling the digital image acquired, cropping the wound in the digital image, colorimetric rebalancing of the digital image, measuring the quality of the digital image.

A further aspect of some embodiments relates to a computer program including instructions envisaged for, when executed by a data processing system, implementing the method as described above.

A further aspect of some embodiments relates to a mobile communication terminal for the automatic determination of information relating to a wound, including a camera for acquiring a digital image of a zone containing the wound and processor suitable for:

determining a first likelihood map associated with a first characteristic of the zone using a first classifier on the image;

determining a second likelihood map associated with a second characteristic of the zone, using a second classifier, distinct from the first classifier, on the image;

segmenting the image into regions of homogeneous colour;

matching the regions with the first and second likelihood maps, and adapting the regions so as to determine regions corresponding substantially to the wound, and determining the information on the basis of the regions corresponding substantially to the wound and displaying the information on a screen of the communication terminal.

Further features and advantages of some embodiments will emerge on reading the following description of an advantageous or preferred embodiment, given by way of example and with reference to the appended FIGURES.

BRIEF DESCRIPTION OF THE FIGURES

FIG. 1 represents schematically an example of a flow chart according to an embodiment.

DETAILED DESCRIPTION OF SOME EMBODIMENTS

Some embodiments enable the automatic or semi-automatic characterisation of a wound, based on a digital image of a zone containing this wound. The characterisation includes determining the characteristics of the wound so as to enable the diagnosis thereof.

A plurality of characteristics may be envisaged.

According to one embodiment, three types of characteristics are involved:

fibrins, buds, and necrosis (or necrotic tissues).

For these three characteristics, associated regions within the wound and/or rates with respect to the wound or with respect to a zone of interest may be determined. Knowing these characteristics, it is further possible to determine the size of the wound, or a higher-level characterisation and for example monitor the progression thereof over time.

Necrosis is a form of a cell damage which leads to the non-programmed death of cells in skin tissue. Unlike apoptosis, which is a programmed cell death, necrosis gives rise to a loss of cell membrane integrity. This results in a flow of products from the cell death to the extracellular space, which is conveyed by a change in the skin which becomes purplish-blue to brown-black.

At the necrotic stage, the wound is completely or partially covered with a dry, brown or black tissue, more or less adhering to the edges. This necrosis may be superficial or concern underlying structures (tendons), with possible subcutaneous fistulisations. There may exist an underlying infection, with clinical signs on the perilesional skin (redness, heat, pain, swelling, etc.).

This is generally the first stage of the ulcer, at the onset thereof. Necrosis may be spontaneous or post-traumatic.

Healing is generally impeded by necrotic debris. A lysis phase by macrophages cleans the wound and enables healing progression. This phase is even longer when the volume of debris is significant and the vascular problems at the origin of the wound (venous, arterial or lymphatic overpressure) are not controlled. To speed up healing at this stage, the necrotic debris is removed (by cleansing, surgical, enzymatic, natural methods, or using therapeutic methods such as dressings, gels, etc.)

Fibrin is a filamentous protein derived from fibrinogen under the action of thrombin during blood coagulation. Fibrin does not pre-exist in the blood; it only appears during coagulation. Coagulation is the conversion of soluble fibrinogen by thrombin into insoluble fibrin which leads to the formation of a clot. In a clot, fibrin forms a mesh which traps the blood cells.

In a wound, fibrin therefore marks a normal stage of the coagulation and skin tissue healing process.

However, in the case of wounds for which the natural cleansing process is insufficient, such as chronic wounds, it may be necessary to remove the fibrinous tissues. The removal of these fibrinous tissues, like the removal of necrotic tissue, may be carried out using various techniques.

The purpose of cleansing is to clean the wound, by removing the necrotic and/or fibrinous tissues which are the source of risks of infection and may cause pain or unpleasant odours, while preserving as much healthy tissue present in the wound as possible.

The bud is the result of cellular multiplication initiated during skin tissue reconstitution. This stage is referred to conventionally as budding or granulation or indeed proliferation, and therefore forms a subsequent stage to fibrin development (sometimes referred to as the inflammatory phase) in the healing process.

Consequently, knowing the proportions of fibrin, necrosis and bud in a wound makes it possible to determine a progression stage in the healing process, and, therefore, determine any care to be provided.

According to some embodiments, in a step referenced E1 in FIG. 1, an image is taken of a zone containing the wound by a digital camera or a functionally equivalent device in order to supply a digital image of the wound.

According to one embodiment, the various steps thereof may be carried out by a "smartphone" or "tablet" type mobile communication terminal and the camera incorporated in this terminal may be used to acquire the digital image of the wound.

The acquisition of a digital image may be guided by various methods set up by a software application controlling the camera.

In particular, guidance may be set up, by a centring window, so as to help centre the wound in the centre of the digital image.

Centring of the wound zone offers by way of further advantage that of limiting the background zones present in the image to be processed.

A further optional, initial step may include or consist of determining the points of the image which may not belong to the wound. For this, using a set of examples having wound and skin zones, it was possible to define in a colorimetric space a maximum polyhedron which contains the set of wound and skin points present in the preceding sets. As such, any point situated outside this polyhedron will be considered to be a point belonging to the image, and any point situated inside this polygon is liable to belong to the "skin" or wound zones.

Furthermore, in the case where the wound includes or consists of a single component, the positioning thereof at the centre of the digital image offers in principle relevant information suitable for drawing up a probability map of a point (or pixel) of the image being from the wound, which decreases from the centre of the image. In other words, the closer a point is to the centre, the higher the probability thereof of belonging to the wound zone. This probability map may be computed in a step E2 in FIG. 1.

In the case where the wound includes or consists of a plurality of disjointed zones, the user may be offered methods enabling the user to point to each zone, for example by indicating a central point for each zone.

The probability map may then be determined by computing for each point of the image the distance to each of these central points, then by assigning the minimum distance thereto.

The distance may be a chamfer distance for example.

This mechanism makes it possible to improve the results of the method according to some embodiments, but forms an optional step and the image may be acquired without using such a mechanism.

A further optional mechanism may include or consist of performing cropping of the wound(s) in the digital image. This step may be an alternative to the centring described above, in order to help speed up and enhance the performances of the method according to some embodiments.

This cropping also makes it possible to determine a probability map of a point of the image belonging to the wound, but in the opposite way to that described for centring: the further a point of the image is from the edge, the higher the probability of it belonging to the wound.

A further optional step includes or consists of accumulating the advantages of the two preceding methods by enabling the user to define two sets of points:
(i) set of points that are certain to belong to the wound;
(ii) set of points that are certain to belong to the skin.

These two sets are used to weight the probability maps, but also to propagate the information of belonging to the skin or to the wound using a "region growing" algorithm. The propagation oracle makes it possible to monitor expansion, it will be possible for example to consider the colorimetric distance to the mean of the set of wound points or skin points.

A further optional step of the method according to some embodiments includes or consists of scaling the digital image acquired.

This scaling may be performed in different ways.

One method includes or consists of arranging a test chart in the vicinity of the wound prior to image capture, such that it appears in the digital image. As such, digital processing of the image makes it possible to determine the size in pixels of the test chart and, in the knowledge of the actual size (in centimetres) of the test chart, it is possible to infer the scale of the digital image therefrom, i.e. the correlation between a dimension expressed in pixels on the digital image and the corresponding dimension expressed in centimetres on the photographed scene.

This test chart may for example be a chip of predetermined shape (for example, square) that may be attached or just placed in the vicinity of the wound prior to image capture. It may also have a predetermined colour or set of colours. The fact that the shape and colour are predetermined helps facilitate the subsequent digital processing.

As such, the processing may include a segmentation of the digital image using a classification of each pixel according to the colour thereof. If the colour of the pixel is similar to the colour of the test chart, it is then classified as "test chart", otherwise it is classified as "other".

It is then interesting for the colour of the test chart to be predetermined so as to facilitate the classification, by being sufficiently removed from the colours liable to be encountered in a wound or on skin tissue. By way of example, the test chart may have by way of colorimetric characteristics: cyan 100%; magenta 57%; yellow 12%; black 66%.

Once this segmentation has been obtained in two classes, morphological filtering may be applied, for example a topological opening with a square, so as to compensate for certain residual defects and aggregate small neighbouring regions.

At the end of this second step, only a single matching region to the test chart should remain. If more remain, the regions of small size may be removed. If a plurality of regions of significant size remain, the region wherein the size is most similar to a square (or any other shape corresponding to the predetermined shape of the test chart) is selected. For this, the oriented encompassing box of each region may be computed and the box wherein the shape is most similar to a square determined, for example by determining the ratio between the box and the surface area occupied by the region in the box thereof.

Once the test chart has been determined in the digital image in step E3, it is easy to infer the size in pixels thereof. In the knowledge of the actual size thereof, it is possible to infer the scale ratio between the digital image and the photographed scene. By this scale, it is subsequently possible to convert any dimensions expressed in pixels in the digital image into an actual dimension expressed in centimeters. For example, once the size of the wound has been determined in the digital image, by the method according to some embodiments, it will be possible to infer the actual size thereof on the skin tissue.

A colorimetric rebalancing step (E4) may subsequently be implemented. This step aims to render the subsequent steps of the method according to some embodiments less sensitive to the colorimetric variations that may be induced, in particular, by the camera sensor, by the ambient brightness, by the heat of the artificial light (neon, tungsten lighting, etc.).

This step may be carried out in different ways, particularly via the use of a multicoloured test chart, or reference chart, which may be positioned in the vicinity of the wound prior to image capture.

It may also be carried out using the same test chart as above for determining the scale. This test chart advantageously or preferentially contains a white reference so as to be able to balance the whites. Rebalancing techniques not using a reference chart may also be used. These may for example include or consist of the "Gray world" or "Retinex" algorithms used for normalising the colours of a digital image. The "Gray World" algorithm was proposed by G. D. Finlayson, B. Shiele and J. L. Crowley in "Comprehensive colour normalization", in Proceedings of European Conference on Computer Vision (ECCV), vol. I, 475-490, in 1998.

The purpose of all of these steps is to compute a conversion suitable for converting the colour observed for the test chart in the digital image to the actual colour thereof. This conversion may then be applied automatically to all of the colours present in the digital image.

A further optional step of the method according to some embodiments may include or consist of making a measurement of the quality of the digital image acquired, in step E5.

It may indeed be considered that, if the quality of the image is insufficient, the subsequent steps will not be capable of providing a satisfactory result and that it is thus effective to stop the method at this stage, for example to enable the user to take another image.

The quality measurement may be based on a measurement of the brightness of the digital image.

According to a first embodiment, the brightness is estimated overall by studying the distribution thereof on the set of pixels of the image (mean and standard deviation). According to a second embodiment, the digital image is subdivided into zones, for example by affixing a regular grid, and the brightness is computed for each zone of the grid. As such, we have more refined information suitable for approximating the lighting variations of the image. Indeed, if there is an excessive difference in brightness between two connected sets of zones of the image (including or consisting of a set of neighbouring elements by transitive closure) on the assumption that the wound and skin zones are relatively homogeneous in chrominance, the variation is then due to a poor lighting condition.

Some embodiments then include a step (E6*a*, E6*b*) for determining likelihood maps for at least three characteristics of the digital image, or, more specifically of the zone including the wound and represented by the digital image.

One of the features of some embodiments is that these likelihood maps are determined independently, by specific and adapted classifiers.

A first classifier makes it possible to determine a likelihood map of a first characteristic which may be fibrin, in a step E6*a*. This classifier may be suitable for distinguishing fibrin from the skin.

A second classifier makes it possible to determine a likelihood map of a second characteristic which may be the bud, in a step E6*b*. This classifier may be suitable for distinguishing buds from the skin.

An optional third classifier may be used to distinguish the wound from the skin. This third classifier may make it possible to enhance the performances of the method according to some embodiments under certain circumstances, but is not essential.

According to one embodiment, these steps for determining likelihood maps may be carried out by classifiers based on supervised learning. These may for example include or consist of support vector machine or "SVM" type classifiers, used in prediction.

Support vector machines (sometimes also referred to as large-margin separators) are a set of supervised learning techniques intended to solve discrimination and regression problems.

They were developed in 1995 by Vladimir Vapnik based on theoretical considerations on a statistical learning theory, and presented in "Statistical Learning Theory", published by Wiley-Interscience editions, New York, 1998. A U.S. Pat. No. 5,649,068 has also been granted on the original algorithm.

They may be seen as a generalisation of linear classifiers. One of the principles of these support vector machines indeed includes or consists of changing the data space such that a non-linear classification problem is referenced to a linear classification problem.

Moreover, they are based on the determination of a hyperplane separating "at best" data into two classes, by maximising the margin, i.e. by maximising the distance of "support vectors" with the hyperplane.

This hyperplane is determined during a learning phase and subsequently makes it possible to classify the points of the digital image acquired, during an operating phase.

The learning may be carried out on a previously defined learning base. This base may be formed from digital images of actual wounds, for which a professional expert determines the correct classification.

In a manner known per se, the support vector machine may "train" on this learning base, i.e. use the classification errors to adapt the parameters thereof. As such, by successive iterations, the parameters (i.e. essentially the hyperplane) of the support vector machine converge towards an optimal solution which will enable the classification of the points of the digital images submitted, if the images are conforming to those submitted during the learning phase.

The learning phase may end after a predetermined number of submissions of images from the learning base, or when the parameters (i.e. the hyperplane) no longer change substantially between two iterations.

The learning base may contain tagged data in 6 classes for example: Fibrin 100%, fibrin 75%, neutral 50%, bud 25%, bud 0% and necrosis. In this list, the percentages represent the ratio of fibrin present in the wound.

The three (or two) classifiers may be the subject of independent learning operations insofar as they must or should learn to carry out separate classifications. They are therefore separate, not necessarily in the basic mechanisms (they may all be support vector machines), but in the parameters thereof.

The result provided by the support vector machines is not directly processable. Indeed, they provide the value of a decision function which is the signed distance of each point to the hyperplane separating the two classes.

Various methods have been proposed to convert the values generated by such a classifier into a probability distribution. One known and usable method is Platt's method. This method is particularly described in the article "Probabilistic outputs for support vector machines and comparison to regularized probability methods" by J. Platt, in A. Smola, P. Bartlett, B. Schölkopf and D. Schuurmans (editors), "Advances in Large Margin Classifiers", Cambridge, Mass., 2000, as well as in "A Note on Platt's Probabilistic Outputs for Support Vector Machines" by H.-T. Lin, C.-J. Lin, R. C. Weng, Machine Learning, 68(3), 267-276, 2007.

Consequently, the method according to some embodiments may envisage steps E7a, E7b for post-processing of the data supplied by the SVM classifiers so as to generate likelihood maps, for example by the direct use of Platt's method: the likelihood maps are constructed with the probabilities computed in this way.

According to a further embodiment, these steps for determining likelihood maps may be carried out using "Gradient Boosted Trees" (GBT) type classifiers. Such classifiers are for example described in the article by Jerome Friedman, "Greedy Function Approximation: A Gradient Boosting Machine". They supply a binary response, but are much faster than support machine vectors.

Some embodiments are therefore not linked with a specific classification method, but include or consist of carrying out at least two classifications according to two characteristics of the wound.

Therefore, two likelihood maps are obtained at this stage:
a first likelihood map associated with fibrin, which gives for each point of the digital image the probability of the point being from fibrin or not.
a second likelihood map associated with buds, which gives for each point of the digital image the probability of the point being from the bud or not.

According to one embodiment, as seen above, a third likelihood map is also generated by a classification E6c and post-processing E7c step. This third likelihood map is associated with a third characteristic of the zone, using a third classifier, this third characteristic corresponding to the wound.

According to one embodiment, a second step for measuring quality may be performed at this stage. This step may be carried out on the colorimetric quality based on the classification.

For example, a certain number of pixels are chosen at random in the digital image (or in a more restricted zone of interest containing the wound), and the distribution of the classes attributed to these pixels is examined. According to the shape of this distribution, it is possible to estimate the quality of the classification that may be performed.

For example, if the mean is close to zero with a low standard deviation, then the classification will provide relatively unreliable responses. It may therefore be considered from this step that the digital image is not of sufficient quality to enable satisfactory characterisation of the wound. An alert may then be reported to the user.

Once these 2 or 3 maps have been obtained, they may be combined in a step E8, so as to obtain an overall likelihood map. This overall map gives for each point of the image the probability of it corresponding to the wound or to healthy skin. For example, a scale of 0 to 255 may be defined, wherein 0 corresponds to a certainty that the point corresponds to skin whereas 255 corresponds to a certainty that the point corresponds to the wound.

This step for combining the likelihood maps enables the matching of the likelihood maps with the segmentation performed in step E9. However, this includes or consists of an optional step because, as will be seen hereinafter, according to an alternative embodiment, the segmentation may be projected onto each of the likelihood maps individually.

As mentioned above, necrosis corresponds to a specific colourisation of skin tissue. It is therefore possible to treat the case of necrosis differently to the two other characteristics (fibrin and bud) although a possible embodiment may include or consist of also using a support vector machine for necrosis and thereby determining a further likelihood map.

However, in one advantageous or preferential embodiment, a segmentation based on colorimetric thresholding is performed so as to determine the points of the digital image corresponding to necrosis.

In the overall likelihood map, the points which were determined as corresponding to necrosis are automatically tagged as belonging to the wound.

A further step E9 of the method according to some embodiments includes or consists of segmenting the digital image into regions of homogeneous colour. This step is parallel with the classification steps E6a, E6b, E6c and post-processing steps E7a, E7b, E7c from a functional point of view, i.e. it is not dependent on these steps either as an input or an output.

In terms of the implementation, it may therefore be executed before or after, or optionally in parallel, if the device whereon the method is implemented permits.

Various segmentation algorithms may be used within the scope of some embodiments.

According to one embodiment, this algorithm for segmenting the digital image into regions is a "split and merge" segmentation algorithm. It was proposed by Horowitz and Pavlidis in "Picture Segmentation by Traversal Algorithm", J. ACM, 23, 368-388, 1976.

The process is broken down into two steps. The initial image may be a first partition resulting from a rough analysis or indeed the raw image.

In the first step, or split, each region is analysed individually. If the region does not verify the homogeneity criterion, then the region is split into blocks (generally in 4 quadrants) and the process is repeated on each sub-region taken individually, arbitrary division may result in this partition not being maximal.

In the second step, or merge, all the pairs of neighbouring regions are studied. If the combination of these two regions verifies the homogeneity criterion, then the regions are merged.

Various implementations of this method have been proposed (by Voronoi diagram, by adjacency graphs, etc.). According to one embodiment, the "k-means" algorithm may be used for splitting each region or block of the digital image.

According to some embodiments, a step E10 for matching the regions obtained by segmentation and the likelihood maps is carried out.

If an overall likelihood map has been determined by combining the likelihood maps corresponding to fibrin and to the bud (and optionally to the wound, and optionally with incorporation of the necrosis-related information obtained by colorimetric segmentation), then this matching may be performed via this overall map.

This matching step may include or consist of considering each region obtained by segmentation and analysing the distribution of this region in the overall likelihood map.

According to this analysis, the regions are adapted so as to determine regions corresponding substantially to the wound.

If the distribution has a low standard deviation, all the pixels of the region may be considered to correspond to the same class, i.e. either to skin, or to the wound, according to the distribution mean. According to this embodiment, only two classes are therefore considered and, in this step E10, subdividing the "wound" class into fibrin, necrosis or bud is not a matter for concern.

If the distribution has an excessively high standard deviation, the region is split into a plurality of sub-regions, and the preceding processing is repeated on each of these sub-regions.

At the end of the process, and therefore once a new segmentation has been obtained, the regions of the same class are merged together and classes that are too small in size may optionally be deleted. The threshold for deciding on belonging in a wound region or not may be an automatic threshold which is dependent on the overall likelihood map distribution.

Finally, a step for smoothing the contours may be envisaged, in order to prevent rough areas. This smoothing may be obtained by a set of conventional morphological operators.

In this way, the regions are adapted and regions corresponding substantially to the wound are determined. The term "substantially" refers to the fact that any automatic classification process is only correct according to a given margin of error. Herein, this classification is dependent on thresholds, particularly on standard deviations of distribution which make it possible to decide automatically whether a region is sufficiently homogeneous or not.

According to a further embodiment, the likelihood maps are not combined and therefore an overall likelihood map is not generated. The matching of the likelihood maps with the regions obtained from segmentation may then be carried out by projecting these regions onto each of the likelihood maps.

A merge mechanism may then be implemented. In each map, one starts from a point indicated as being of the wound (it may have been indicated by the user in the centring mechanism described above), and the neighbouring regions are merged if the probability thereof of being of the wound (in fact, of the fibrin, bud or necrosis, according to the likelihood map in question) is greater than a given threshold. This threshold is adapted to each of the likelihood maps.

A further alternative is that of considering the convex envelope of the wound zone defined and verifying for each of the regions not classified as being of the wound if they can be aggregated with the wound zone. The decision then depends on their mean probability thereof and the percentage of the surface area thereof which is included in the surface area of the convex envelope.

Care may be taken not to perform merging with a region touching the edge of the image.

The merging is repeated once a neighbouring region meets these criteria. The contour obtained may be smoothed as described above.

Some embodiments then include a step E11 for automatically determining information relating to the wound, on the basis of regions corresponding substantially to the wound determined in step E10 above.

This information may include the size of the wound.

Indeed, the scale having been previously determined, it is then easy to infer this size from the knowledge of the regions corresponding to the wound: it may for example suffice to multiply the number of pixels belonging to these regions by the size in centimetres corresponding to one pixel.

According to one embodiment, this step for determining information relating to the wound includes a step for determining rates of distribution of the first and second characteristics, i.e. typically of fibrin and the bud. A necrosis distribution rate may also be determined.

According to one embodiment, these rates may be determined using the same process as previously for determining the wound, but, on one hand, based on the regions corresponding to the wound and, on the other, retaining the information on the various characteristics of the wound.

As such, a segmentation step and a classification step may be implemented, in parallel, as described above.

The segmentation step includes or consists of segmenting the regions corresponding substantially to the wound with an algorithm which may be the same as for step E9 for segmenting the digital image.

The classification step may be based on a new classifier caused to separate fibrin from the bud (as it is known that in the regions in question, only the wound is involved). Here again, the classifier may be a support vector machine (SVM) used in regression. The prediction of the classifier is calibrated so as to produce a result predicting the rate of fibrin in the wound.

Here again, Platt's method may be used to obtain an output probability of the classifier.

For each region r determined by the segmentation, a rate of fibrin tf(r) may be determined with the equation:

$$tf(r) = \sum_r f(p) \cdot \frac{S(r)}{S}$$

wherein S(r) is the surface area of the region r; S the total surface area of the regions corresponding substantially to the wound and f(p) the result of a function of the probability p supplied by the classifier.

This function f makes it possible to obtain a result according to a more realistic and demonstrative quantification. Such a function f may for example be of the following format:

$$f(p) = \begin{cases} 0 & \text{if } p < \alpha_1 \\ 0.25 & \text{if } \alpha_1 < p < \alpha_2 \\ 0.5 & \text{if } \alpha_2 < p < \alpha_3 \\ 0.75 & \text{if } \alpha_3 < p < \alpha_4 \\ 1 & \text{if } p > \alpha_4 \end{cases}$$

$\alpha_1, \alpha_2, \alpha_3, \alpha_4$ are configurable thresholds.

According to this embodiment, the rate of fibrin varies from 0 to 100% by 25% intervals.

The rate of fibrin forms a further item of information relating to the wound. It may be indicated to the user of the method according to some embodiments, for example be displayed on the screen of a mobile communication terminal.

Obviously, some embodiments are not limited to the examples described and represented, but numerous alternative embodiments are accessible to those of ordinary skill in the art.

The invention claimed is:

1. A method for digital analysis of a wound for automatic determination of information relating to the wound, comprising:
   acquiring a digital image of a zone of skin containing the wound;
   determining a first likelihood map associated with a first characteristic of the zone using a first classifier on the image;
   determining a second likelihood map associated with a second characteristic of the zone, using a second classifier, distinct from the first classifier, on the image;
   segmenting the image into regions of homogeneous color, wherein (a) the segmenting the image into regions of homogeneous color and (b) the determining the first likelihood map and the determining the second likelihood map are performed independently of each other;
   matching the regions with the first and second likelihood maps, and adapting the regions so as to determine regions corresponding substantially to the wound based at least in part on the matching; and
   determining the information based on the regions corresponding substantially to the wound.

2. The method according to claim 1, wherein the first characteristic corresponds to fibrin, and the second characteristic corresponds to buds.

3. The method according to claim 2, further comprising determining a third likelihood map associated with a third characteristic of the zone, using a third classifier, the third characteristic corresponding to the wound.

4. The method according to claim 2, wherein the first and second classifiers are support vector machines.

5. The method according to claim 2, wherein the first likelihood map and the second likelihood map are combined in an overall likelihood map to match the regions of homogeneous color with the first and second likelihood maps.

6. The method according to claim 2, wherein the image is segmented into regions by a split and merge algorithm.

7. The method according to claim 1, further comprising determining a third likelihood map associated with a third characteristic of the zone, using a third classifier, the third characteristic corresponding to the wound.

8. The method according to claim 7, wherein the first and second classifiers are support vector machines.

9. The method according to claim 7, wherein the first likelihood map and the second likelihood map are combined in an overall likelihood map to match the regions of homogeneous color with the first and second likelihood maps.

10. The method according to claim 1, wherein the first and second classifiers are support vector machines.

11. The method according to claim 10, wherein the first likelihood map and the second likelihood map are combined in an overall likelihood map to match the regions of homogeneous color with the first and second likelihood maps.

12. The method according to claim 1, wherein the first likelihood map and the second likelihood map are combined in an overall likelihood map to match the regions of homogeneous color with the first and second likelihood maps.

13. The method according to claim 12, wherein, in the overall likelihood map, points corresponding to necrosis are determined by segmentation based on colorimetric thresholding.

14. The method according to claim 1, wherein the image is segmented into regions by a split and merge algorithm.

15. The method according to claim 1, wherein the information includes a size of the wound.

16. The method according to claim 1, wherein the determination of the information includes determining distribution rates of the first and second characteristics.

17. The method according to claim 16, wherein the determining distribution rates of the first and second characteristics uses a classifier distinguishing the first characteristic from the second characteristic within regions corresponding substantially to the wound.

18. The method according to claim 1, further including performing one or a plurality of steps prior to the determination of the first and second likelihood maps among:
   centering the wound in a middle of the image,
   computing a probability map,
   scaling the image acquired,
   cropping the wound in the image,
   colorimetric rebalancing of the image, and
   measuring a quality of the image.

19. A computer program including instructions stored on a non-transitory computer-readable medium, when executed by a data processing system, implementing the method according to claim 1.

20. A mobile communication terminal for automatic determination of information relating to a wound, comprising:
   a camera for acquiring a digital image of a zone containing the wound; and
   a processor suitable for:
   determining a first likelihood map associated with a first characteristic of the zone using a first classifier on the image;
   determining a second likelihood map associated with a second characteristic of the zone, using a second classifier, distinct from the first classifier, on the image;
   segmenting the image into regions of homogeneous color, wherein (a) the segmenting the image into regions of homogeneous color and (b) the determining the first likelihood map and the determining the second likelihood map are performed independently of each other;
   matching the regions with the first and second likelihood maps, and adapting the regions so as to determine regions corresponding substantially to the wound based at least in part on the matching, and
   determining the information on the basis of the regions corresponding substantially to the wound and displaying the information on a screen of the mobile communication terminal.

21. A method for digital analysis of a wound for automatic determination of information relating to the wound, comprising:
   acquiring a digital image of a zone of skin containing the wound;
   determining a first likelihood map associated with a first characteristic of the zone using a first classifier on the image;
   determining a second likelihood map associated with a second characteristic of the zone, using a second classifier, distinct from the first classifier, on the image;
   segmenting the image into regions of homogeneous color, independently of the determining the first likelihood map and the determining the second likelihood map;
   matching the regions with the first and second likelihood maps, and adapting the regions so as to determine regions corresponding substantially to the wound based at least in part on the matching; and determining the information
   based on the regions corresponding substantially to the wound;

wherein the segmenting the image into regions of homogeneous color is performed in parallel with at least one step selected from the group consisting of (a) the determining the first likelihood map and (b) the determining the second likelihood map.

* * * * *